US008542410B2

(12) United States Patent
Ramesh et al.

(10) Patent No.: US 8,542,410 B2
(45) Date of Patent: Sep. 24, 2013

(54) LEAST SQUARES BASED EXPOSURE MODULATION FOR BANDING COMPENSATION

(75) Inventors: Palghat Ramesh, Pittsford, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 909 days.

(21) Appl. No.: 12/555,287

(22) Filed: Sep. 8, 2009

(65) Prior Publication Data

US 2011/0058184 A1 Mar. 10, 2011

(51) Int. Cl.
*H04N 1/407* (2006.01)
*G03G 15/00* (2006.01)
*G03G 15/01* (2006.01)

(52) U.S. Cl.
USPC ......... 358/3.26; 358/1.9; 358/3.24; 358/3.27; 399/49; 347/118

(58) Field of Classification Search
None
See application file for complete search history.

(56) References Cited

U.S. PATENT DOCUMENTS

| | | | | |
|---|---|---|---|---|
| 4,400,740 | A | 8/1983 | Traino et al. | |
| 5,165,074 | A | 11/1992 | Melino | |
| 5,251,058 | A | 10/1993 | MacArthur | |
| 5,519,514 | A | 5/1996 | TeWinkle | |
| 5,550,653 | A | 8/1996 | TeWinkle | |
| 5,659,414 | A | 8/1997 | Appel et al. | |
| 5,680,541 | A | 10/1997 | Kurosu et al. | |
| 5,818,507 | A | 10/1998 | Genovese | |
| 5,835,121 | A | 11/1998 | Genovese et al. | |
| 5,963,244 | A | 10/1999 | Metha et al. | |
| 6,266,150 | B1 * | 7/2001 | Brossman et al. | 358/1.15 |
| 6,342,963 | B1 | 1/2002 | Yoshino | |
| 6,359,641 | B1 | 3/2002 | Nacman et al. | |
| 6,462,821 | B1 | 10/2002 | Borton et al. | |
| 6,567,170 | B2 | 5/2003 | Tandon et al. | |
| 6,621,576 | B2 | 9/2003 | Tandon et al. | |
| 6,694,109 | B1 | 2/2004 | Donaldson et al. | |
| 6,760,056 | B2 * | 7/2004 | Klassen et al. | 347/251 |
| 6,975,949 | B2 | 12/2005 | Mestha et al. | |
| 7,024,152 | B2 | 4/2006 | Lofthus et al. | |
| 7,038,816 | B2 | 5/2006 | Klassen et al. | |
| 7,054,568 | B2 * | 5/2006 | Mizes et al. | 399/49 |
| 7,058,325 | B2 | 6/2006 | Hamby et al. | |
| 7,120,369 | B2 * | 10/2006 | Hamby et al. | 399/49 |
| 7,136,616 | B2 | 11/2006 | Mandel et al. | |
| 7,177,585 | B2 | 2/2007 | Matsuzaka et al. | |
| 7,492,381 | B2 | 2/2009 | Mizes et al. | |
| 7,564,475 | B1 * | 7/2009 | Mizes | 347/253 |
| 8,358,866 | B2 * | 1/2013 | Qian et al. | 382/260 |
| 2003/0063183 | A1 | 4/2003 | AuYeung et al. | |
| 2005/0196187 | A1 * | 9/2005 | Mizes et al. | 399/49 |
| 2005/0265739 | A1 * | 12/2005 | Hamby et al. | 399/49 |
| 2006/0077488 | A1 | 4/2006 | Zhang et al. | |
| 2006/0077489 | A1 | 4/2006 | Zhang et al. | |
| 2007/0052991 | A1 | 3/2007 | Goodman et al. | |
| 2007/0139733 | A1 | 6/2007 | Mizes et al. | |
| 2007/0236747 | A1 | 10/2007 | Paul | |
| 2008/0013848 | A1 * | 1/2008 | Wu et al. | 382/254 |
| 2009/0002724 | A1 | 1/2009 | Paul et al. | |
| 2009/0046325 | A1 * | 2/2009 | Paul et al. | 358/3.26 |

* cited by examiner

*Primary Examiner* — Steven Kau
(74) *Attorney, Agent, or Firm* — Pillsbury Winthrop Shaw Pittman, LLP

(57) ABSTRACT

A method, system, and computer program product for estimating exposure modulation in an image printing system is disclosed. The method includes determining a banding profile for an image printing system by a processor; determining an adjusted exposure modulation profile based on the banding profile using a least squares estimation by the processor; and printing an output based on the adjusted exposure profile.

21 Claims, 10 Drawing Sheets

LEAST SQUARES BASED EXPOSURE MODULATION FOR BANDING COMPENSATION

CROSS REFERENCES

U.S. patent application Ser. No. 12/555,308 filed on Sep. 8, 2009, entitled "LEAST SQUARES BASED COHERENT MULTIPAGE ANALYSIS OF PRINTER BANDING FOR DIAGNOSTICS AND COMPENSATION," by Ramesh et al.;

U.S. patent application Ser. No. 12/555,275 filed on Sep. 8, 2009, entitled "BANDING PROFILE ESTIMATION USING SPLINE INTERPOLATION," by Ramesh et al.; and U.S. Patent Application Pub. No. 2009/0002724, entitled "BANDING PROFILES ESTIMATOR USING MULTIPLE SAMPLING INTERVALS," by Paul et al., each of which herein incorporated by reference in its entirety.

FIELD

The present disclosure relates to a method, system and computer program product for estimating an exposure modulation in an image printing system.

BACKGROUND

An electrophotographic, or xerographic, image printing system employs an image bearing surface, such as a photoreceptor drum or belt, which is charged to a substantially uniform potential so as to sensitize the surface thereof. The charged portion of the image bearing surface is exposed to a light image of an original document being reproduced. Exposure of the charged image bearing surface selectively discharges the charge thereon in the irradiated areas to record an electrostatic latent image on the image bearing surface corresponding to the image contained within the original document. The location of the electrical charge forming the latent image is usually optically controlled. More specifically, in a digital xerographic system, the formation of the latent image is controlled by a raster output scanning device, usually a laser or LED source.

After the electrostatic latent image is recorded on the image bearing surface, the latent image is developed by bringing a developer material into contact therewith. Generally, the electrostatic latent image is developed with dry developer material comprising carrier granules having toner particles adhering triboelectrically thereto. However, a liquid developer material may be used as well. The toner particles are attracted to the latent image, forming a visible powder image on the image bearing surface. After the electrostatic latent image is developed with the toner particles, the toner powder image is transferred to a media, such as sheets, paper or other substrate sheets, using pressure and heat to fuse the toner image to the media to form a print.

The image printing system generally has two important dimensions: a process (or a slow scan) direction and a cross-process (or a fast scan) direction. The direction in which an image bearing surface moves is referred to as the process (or the slow scan) direction, and the direction perpendicular to the process (or the slow scan) direction is referred to as the cross-process (or the fast scan) direction.

Electrophotographic image printing systems of this type may produce color prints using a plurality of stations. Each station has a charging device for charging the image bearing surface, an exposing device for selectively illuminating the charged portions of the image bearings surface to record an electrostatic latent image thereon, and a developer unit for developing the electrostatic latent image with toner particles. Each developer unit deposits different color toner particles on the respective electrostatic latent image. The images are developed, at least partially in superimposed registration with one another, to form a multi-color toner powder image. The resultant multi-color powder image is subsequently transferred to a media. The transferred multicolor image is then permanently fused to the media forming the color print.

Banding generally refers to periodic defects on an image caused by a one-dimensional density variation in the process (slow scan) direction. Various sources of banding exist in a image printing system and the frequencies of these sources are typically known from a mechanical design of the image printing system. Bands can result due to many different types of variations within components and/or subsystems, such as roll run out (variations in roll or drum diameter) in a developer roll or photoreceptor drum, wobble in the polygon mirror of the laser raster optical scanner (ROS), and the like.

Banding compensation may be performed by modulating the power or intensity of one or more exposing devices, where exposure power is modulated for each scan line based on the banding profile. For examples of methods and systems for modulating exposure power or intensity, see, e.g., U.S. Pat. Nos. 7,492,381, 6,359,641, 5,818,507, 5,659,414, 5,251,058, 5,165,074 and 4,400,740 and U.S. Patent Application Pub. No. 2003/0063183, each of which herein incorporated by reference in its entirety.

To modulate the exposure power for banding compensation, a banding profile may be determined and analyzed. For example, see U.S. Patent Pub. Nos. 2009/0002724 and 2007/0236747, each of which herein incorporated by reference in its entirety, for examples of systems and methods for measuring the frequency, amplitude, and/or phase of bands. Banding profiles analyses may involve printing several pages of uniform halftone image, and measuring the prints using an offline or inline spectrophotometer, scanner, or density sensor. The image data is averaged in the cross process direction to obtain one-dimensional profiles in the process direction which are then analyzed for banding.

An exposure correction determined from the banding profile may be applied to a Tone Reproduction Curve (TRC). For examples of TRCs, see, e.g., U.S. Pat. Nos. 5,963,244 and 6,694,109, each of which herein incorporated by reference in its entirety. However, the resulting performance can be unsatisfactory as certain parts of the TRC may be undercompensated and certain parts overcompensated.

SUMMARY

In an embodiment, a method for estimating an exposure modulation in an image printing system to correct for banding is disclosed. The image printing system comprises at least one marking engine, the at least one marking engine comprising a charging device for charging the image bearing surface, an exposing device for irradiating and discharging the image bearing surface to form a latent discharged image, and a developer unit for developing toner to the discharged portion of the image bearing surface. The method includes determining a banding profile for an image printing system by a processor; determining an adjusted exposure modulation profile based on the banding profile using a least squares estimation by the processor; and printing an output based on the adjusted exposure modulation profile.

In another embodiment, a system for estimating an exposure modulation in an image printing system is disclosed. The system includes a marking engine; a sensor configured to obtain image data across multiple measurement intervals; an exposing device; and a processor. The processor is configured to determine a banding profile. The processor is also configured to determine an adjusted exposure modulation profile based on the banding profile using a least squares estimation.

In another embodiment, a computer program product, comprising a machine-readable medium having a machine-readable program embodied therein, said machine-readable program adapted to implement a method for estimating an exposure modulation in an image printing system is disclosed. The method includes determining a banding profile for an image printing system; and determining an adjusted exposure modulation profile based on the banding profile using a least squares estimation.

Other aspects, features, and advantages will become apparent from the following detailed description, and the accompanying drawings.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

The present disclosure addresses the issue of optimizing exposure modulation. The present disclosure proposes a method for optimizing exposure modulation for banding correction using least squares estimation for improved performance across a tone reproduction curve (TRC) having at least two steps. First, a banding profile is determined for an image printing system at several area coverages on the TRC. Second, an adjusted exposure modulation profile is determined based on the banding profile using a least squares estimation. An output print may reflect the adjusted exposure modulation profile.

Figure 1:
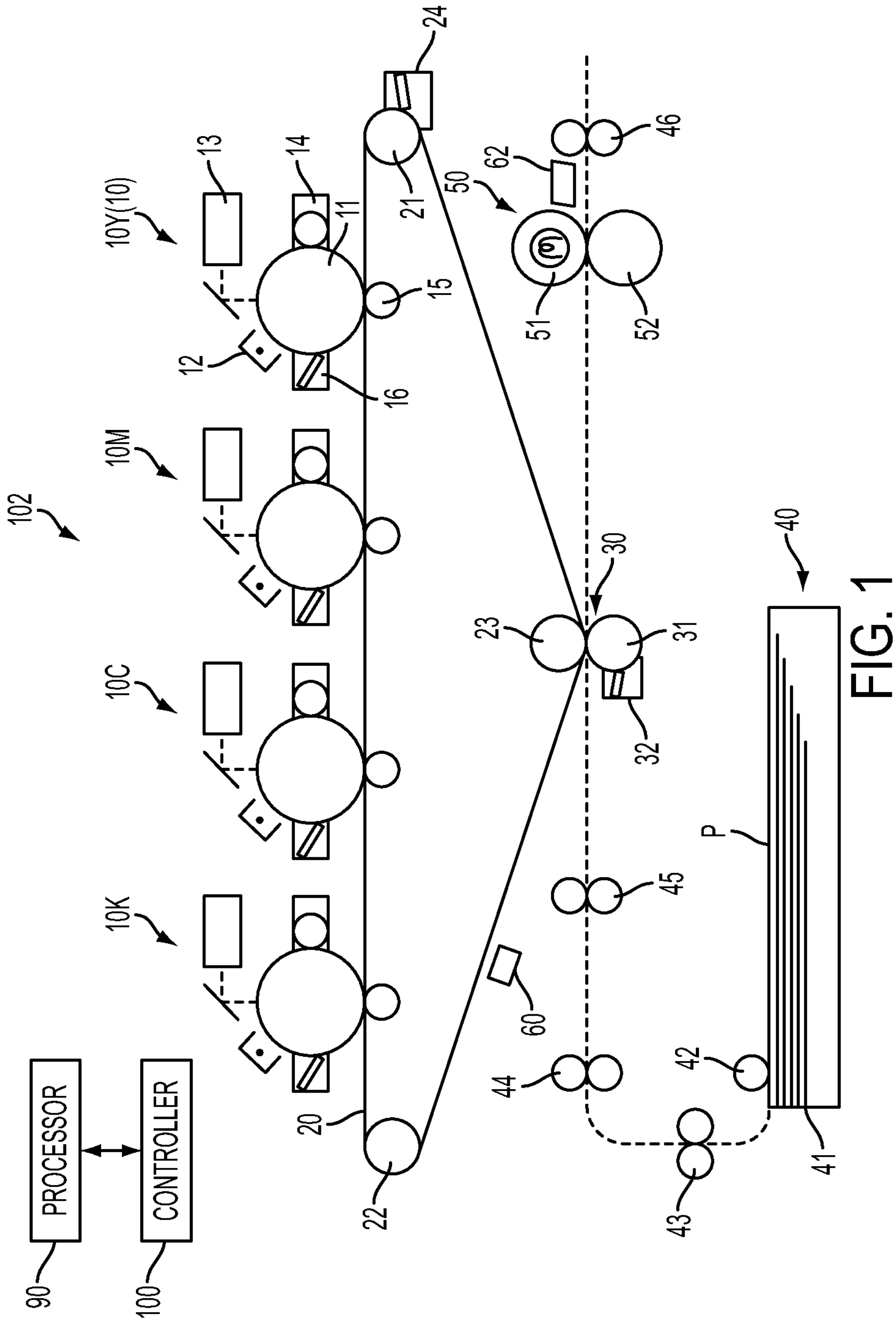
FIG. 1 illustrates an image printing system incorporating an embodiment.

FIG. 1 illustrates a schematic perspective view of an image printing system 102 in accordance with an embodiment. The image forming apparatus includes plural (in this exemplary embodiment, four) marking engines 10, an intermediate transfer belt 20, a secondary transfer device 30, a sheet carrying device 40, and a fixing device 50. The image forming apparatus further includes a controller 100 and a processor 90. A controller 100 may be provided to control the various elements and sequence of operations of the image printing system 102. In some implementations, the controller 100 and/or processor 90 may be dedicated hardware like ASICs or FPGAs, software (firmware), or a combination of dedicated hardware and software. Processor 90 may include one processor or one or more sub-processors. For the different applications of the embodiments disclosed herein, the programming and/or configuration may vary. Specifically, there is shown an "intermediate-belt-transfer" xerographic color image printing system, in which successive primary-color (e.g., C, M, Y, K) images are accumulated on image bearing surfaces 11. Each image bearing surface 11 in turn transfers the images to an intermediate transfer member 30. However, it should be appreciated that any image printing machine, such as monochrome machines using any technology, machines that print on photosensitive substrates, xerographic machines with multiple photoreceptors, "image-on-image" xerographic color image printing systems (e.g., U.S. Pat. No. 7,177,585, herein incorporated by reference in its entirety), Tightly Integrated Parallel Printing (TIPP) systems (e.g. U.S. Pat. Nos. 7,024,152 and 7,136,616, each of which herein incorporated by reference in its entirety), or ink-jet-based machines, may utilize the present disclosure as well.

The marking engine 10 includes a yellow unit 10Y for forming a yellow image, a magenta unit 10M for forming a magenta image, a cyan unit 10C for forming a cyan image, and a black unit 10K for forming a black image. The yellow unit 10Y, the magenta unit 10M, the cyan unit 10C and the black unit 10K form toner images of respective color components as images, by the electrophotography system.

The marking engines 10Y, 10M, 10C and 10K, which may serve as an image forming section, have the same configuration except colors of the used toner. Accordingly, for example, the yellow unit 10Y will be described below. The yellow unit 10Y includes an image bearing surface 11, a charging device 12, an exposure device 13, a developing device 14, a primary transfer device 15 and a drum cleaner 16. The charging device 12 charges the image bearing surface 11 to a predetermined potential. The exposure device 13 exposes the charged image bearing surface 11 to form an electrostatic latent image. The developing device 14 receives each color component toner (in the yellow unit 10Y, yellow toner) and develops the electrostatic latent image formed on the image bearing surface 11 with the toner. The primary transfer device 15, for example, includes a roll member (primary transfer roll) which is in pressure-contact with the image bearing surface 11 via the intermediate transfer belt 20 with the intermediate transfer belt interposed between the primary transfer device 15 (roll member) and the image bearing surface 11. The primary transfer device 15 applies a predetermined transfer bias between the image bearing surface 11 and the primary transfer roll to primarily transfer the toner image formed on the image bearing surface 11 onto the intermediate transfer belt 20. The drum cleaner 16 removes remaining toner on the image bearing surface 11 after the primary transfer.

The intermediate transfer belt 20, which serves as a recording material, may be wound on a driving roll 21, a driven roll 22 and a backup roll 23. Among them, the driving roll 21 may be rotatable, and may stretch the intermediate transfer belt 20 and transmit a driving force to the intermediate transfer belt 20. The driven roll 22 may be rotatable, and may stretch the intermediate transfer belt 20 and may be rotated as the intermediate transfer belt 20 rotates. The backup roll 23 may be rotatable, and may stretch the intermediate transfer belt 20 and may serve as a constituent component of the secondary transfer device 30 as described below. A belt cleaner 24 for removing the remaining toner on the intermediate transfer belt 20 after secondary transfer may be provided so as to face a part of the intermediate transfer belt 20 wound on the driving roll 21.

The secondary transfer device 30 includes a secondary transfer roll 31 that is rotatable and that is in pressure-contact with a surface, on a side where the toner image is carried, of the intermediate transfer belt 20. The secondary transfer device 30 also includes a backup roll 23 disposed on the rear surface of the intermediate transfer belt 20 to form an opposite electrode for the secondary transfer roll 31. A predetermined secondary transfer bias is applied between the secondary transfer roll 31 and the backup roll 23 such that the toner image on the intermediate transfer belt 20 is secondarily transferred onto a sheet of paper P. For example, a roll cleaner 32 for removing the toner transferred from the intermediate transfer belt 20 to the secondary transfer roll 31 is mounted on the secondary transfer roll 31.

Image printing system 102 includes sensors 60 and 62 that are configured to provide image data (e.g., reflectance of the image in the process and/or cross-process direction) to the processor 104. The sensor 60 may be configured to sense images created on the intermediate transfer belt 20 and/or to scan test patterns. Sensor 62 may be configured to sense images created in output prints, including paper prints. It should be appreciated that any number of sensors may be provided, and may be placed anywhere in the image printing system as needed, not just in the locations illustrated.

It should be appreciated that sensors 60 and 62 may be Automatic Density Control (ADC) sensors. For an example of an ADC sensor, see, e.g., U.S. Pat. No. 5,680,541, which is incorporated herein by reference in its entirety. Sensors 60 and 62 also may be a Full Width Array (FWA) or Enhanced Toner Area Coverage (ETAC). See, e.g., U.S. Pat. Nos. 6,975,949 and 6,462,821, each of which herein incorporated by reference in its entirety, for an example of a FWA sensor and an example of a ETAC sensor, respectively. Sensors 60 and 62 may include a spectrophotometer, color sensors, or color sensing systems. For example, see, e.g., U.S. Pat. Nos. 6,567,170; 6,621,576; 5,519,514; and 5,550,653, each of which herein is incorporated by reference in its entirety. It is should be appreciated that that other linear array sensors may also be used, such as contact image sensors, CMOS array sensors or CCD array sensors.

Processor 90 is configured to receive reflectance of the image, or image data, in the process and/or cross-process direction sensed by sensors 60 and/or 62. The processor 90 is configured to generate a reflectance profile data and send the data to the controller 100. Processor 90 may also be configured to augment image data with timing data from a signal that is synchronous with the banding source, as disclosed in U.S. Patent Application Pub. No. 2007/0236747, herein incorporated by reference in its entirety.

The sheet carrying device 40 includes a sheet accommodating section 41, a pickup roll 42, a separation roll 43, a preregistration roll 44, a registration roll 45 and an ejection roll 46. The sheet accommodating section 41 has an opening at its upper part, has a rectangular shape and accommodates the sheet P therein. The pickup roll 42 is provided above the sheet accommodating section 41 to continuously feed an uppermost sheet P of the stack of sheets P accommodated in the sheet accommodating section 41. The separation roll 43 separates and carries the sheets P, which are continuously fed by the pickup roll 42, one by one. The preregistration roll 44 carries the sheet P carried through the separation roll 43 downstream and forms a loop together with the registration roll 45. The registration roll 45 pauses the carrying of the sheet P and resumes the rotation at a predetermined timing so as to feed the sheet P while controlling the registration with respect to the secondary transfer device 30. The ejection roll 46 carries the sheet P, on which the toner image is transferred by passing through the secondary transfer device 30 and is fused by passing through the fixing device 50, toward a not-shown ejection section.

The fixing device 50 includes a heating roll 51 which has a heating source therein and which is rotatable. The fixing device 50 also includes a pressing roll 52 which is in contact with the heating roll 51 and rotates as the heating roll 51 rotates.

In one embodiment, processor 90 may be configured obtain timing information and combine timing information with image data. For example, while printing, the page timing information, such as the page synchronization signal, and the banding source timing information, such as the photoreceptor one around signal, may be obtained. The page synchronization signal may be a signal internally generated by controller 100 (shown in FIG. 2), for example, as is well known in the art. See U.S. Pat. No. 6,342,963, FIGS. 13A and 13B and corresponding discussion, herein incorporated by reference in its entirety, for examples of page synchronization signals. The page synchronization signal may indicate the beginning and end of a page of an output image. The photoreceptor once-around may indicate the beginning and end of one photoreceptor cycle, wherein a cycle begins and ends at the same point on the photoreceptor. The photoreceptor once-around signal may be generated by a optical sensor or encoder mounted on the rotating shaft of the photoreceptor drum, as is well known in the art. For more details about obtaining timing information and combining timing information with image data, see, e.g., U.S. Patent Application Pub. No. 2009/002724 and 2007/0236747, each of which herein incorporated by reference in its entirety.

Figure 2:
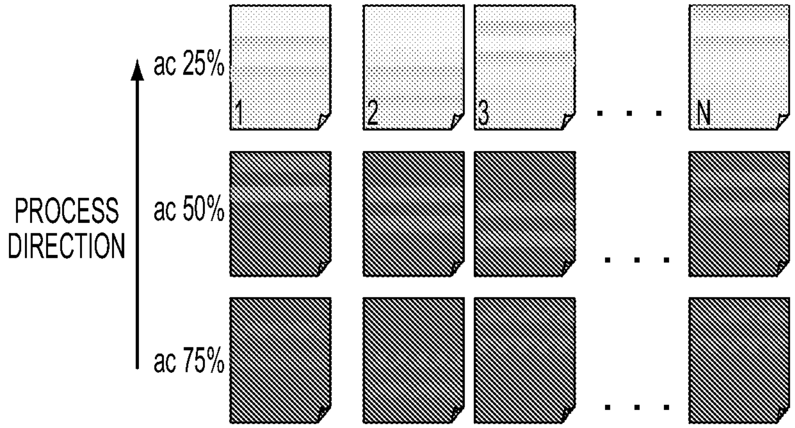
FIG. 2 illustrates an example of a banding calibration target for different area coverages.

In another embodiment, processor 90 may be configured to determine a banding profile. For example, for each area coverage, the printed pages may be scanned using an offline or inline scanner or spectrophotometer or density sensor, such as sensors 60 and 62, and averaged in the cross process direction to obtain the one-dimensional page profiles in the process direction. Using the page timing information, the banding profile data across multiple pages may be combined into a coherent signal, as is well known in the art. Processor 90 also may be configured to estimate the aperiodic components of the coherent signal for each area coverage. Processor 90 also may be configured to use a least squares estimation or weighted least square estimation, to determine an exposure modulation profile needed to correct for the periodic components optimally across all area coverages. The weights for the select area coverages can be preset in the factory or dynamically adjusted based on a customer image or user input. For example, assuming that the area coverages (AC) in the banding calibration target are [25%, 50% 75%], as shown in FIG. 2, by choosing weights of [1, 1, 1], wherein each AC is given full weight, an exposure modulation profile that is optimal across the entire TRC (0 to 100%) may be obtained. However, if the customer image is mostly 50% AC, then a better choice of weights may be [0, 1, 0]. In general, weights can be chosen based on information of spatial AC distribution on the output image page. This information might be available when the page is being Raster Image Processed (ripped).

FIG. 2 illustrates an example of a banding calibration target consisting of P pages of uniform halftone at a few select area coverages ($i_{ac}=1 \ldots n_{ac}$) may be printed. As shown, several bands are present across multiple pages for different area coverages.

Figure 3:
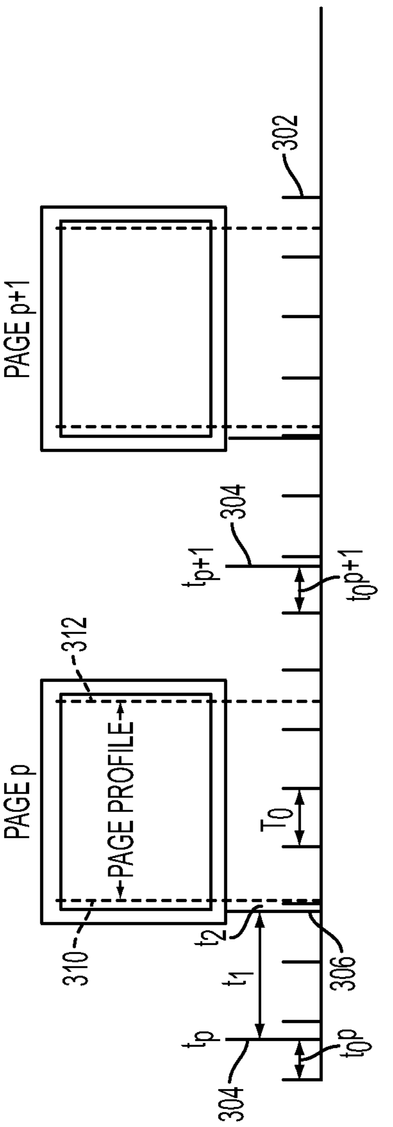
FIG. 3 illustrates a timing diagram.

FIG. 3 illustrates an example of a timing diagram used for banding profile estimation. $t_p(i_{ac})$ is the page synchronization time for page p for area coverage $i_{ac}$. $t_1$ is the time between the page synchronization and start of an image on a page. $t_2$ is the time between start of an image on a page and start of measured profile on the page. Both $t_1$ and $t_2$ are fixed for a particular target image. $t_0^P$ is the time between the page synchronization for page p and the most recent once around signal. $T_0$ is the once around period of the banding source. The banding source frequency is $f_0=1/T_0$. The lines 302 represent the once around sensor signal. The lines 304 are the page synchronization signals. The line 306 indicates the beginning of an image on a page. Dotted line 310 indicates the beginning of a profile, while dotted line 312 indicates the end of the profile on the page.

For example, a point q in the page profile for page p, is located at a distance $x_q$ from the beginning of the profile. The time at q from the beginning of the page profile is $t_q=x_q/v$, where v is the process speed. The banding source once around time at location q on page p is given by $t_{pq}=\mathrm{Mod}(t_n^P+t_1+t_2+t_q,T_0)$. Function $y(i_{ac},p,q)$ may represent characteristic of a color, including but not limited to luminance, color difference, or scanner grayscale value at location q on page p as measured by an offline or inline spectrophotometer or scanner or density sensor for halftone density $i_{ac}$.

The aperiodic components from the signal for each area coverage may be accounted for first. The aperiodic components can arise from page to page drift and paper lead edge to trail edge variation. For example, a model $\hat{y}_1(i_{ac}, p, q)=g_1(i_{ac}, p)+g_2(i_{ac},q)$, where $g_1(p)$ refers to the page to page drift, $g_2(q)$ refers to the lead edge to trail edge variation may model aperiodic components. Assuming that $g_1$ and $g_2$ can be expressed as polynomials:

$$g_1(i_{ac}, p) = \sum_{k=0}^{n_1} a_k(i_{ac})t_p(i_{ac})^k \text{ and } g_2(i_{ac}, q) = \sum_{k=1}^{n_2} b_k(i_{ac})t_q^k,$$

where $n_1$ and $n_2$ are the order of the polynomial for $g_1$ and $g_2$, respectively, using Lease Squares Estimation, $a_k(i_{ac})$ and $b_k(i_{ac})$ may be solved for according to the following formula:

$$\mathrm{Min}\left[\sum_{p=1}^{P}\sum_{q=1}^{Q}(y(i_{ac}, p, q) - \hat{y}_1(i_{ac}, p, q))^2\right] \text{ for } i_{ac} = 1 \ldots n_{ac}$$

Where P may be the number of pages and Q is the number of samples per page. The residual profile $y_2(i_{ac}, p, q)=y(i_{ac}, p, q)-\hat{y}(i_{ac},p,q)$ may be used to obtain the periodic banding signature, or banding profile.

Figure 4:
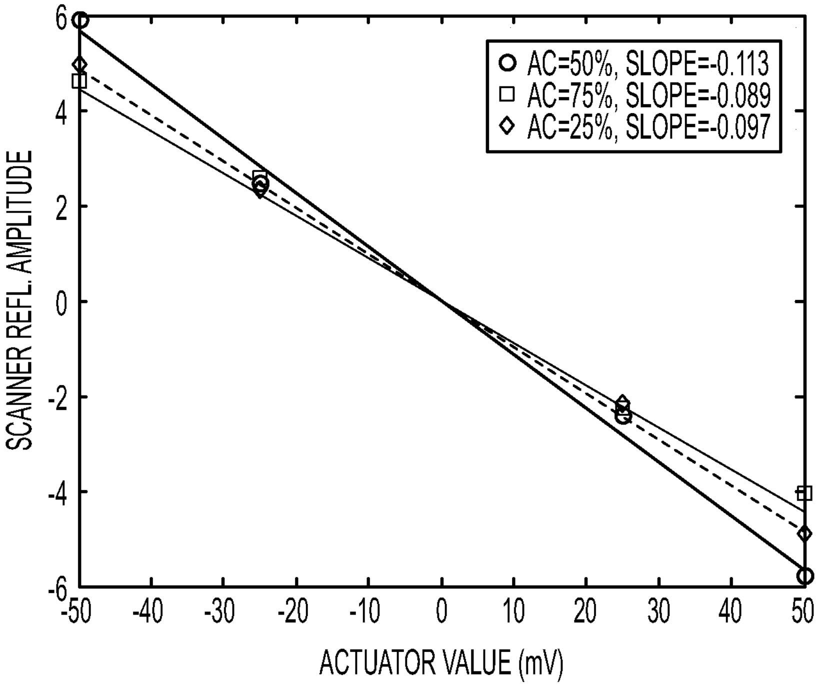
FIG. 4 illustrates a graph indicating a variation in color (scanner reflectance) due to change in exposure level for the various area coverages

FIG. 4 illustrates a graph indicating a variation in color (scanner reflectance) due to change in exposure level for the various area coverages. For small changes in exposure levels, the variation may be linear. Impact of the exposure may be represented with the slope, $$s(i_{ac}) = \frac{dL^*(i_{ac})}{de}.$$

FIG. 4 also shows that slope is steepest at 50% Area Coverage and is more shallow at 25% and 75% Area Coverage.

To determine the adjusted exposure modulation profile, function z(t), for example, may represent the adjusted exposure modulation profile across all area coverages ($i_{ac}=1 \ldots n_{ac}$) where t is the once around time of the banding source (e.g. PR drum). z(t) may be expressed using sinusoidal bases functions at the source frequency and its harmonics $$z(t) = \sum_{k=1}^{n_h}(c_k \mathrm{Cos}(2\pi k f_0 t) + d_k \mathrm{Sin}(2\pi k f_0 t)).$$

The coefficients $c_k$ and $d_k$ can be obtained from Weighted Least Squares Estimation:

$$\mathrm{Min}\left[\sum_{i_{ac}=1}^{n_{ac}}\sum_{p=1}^{P}\sum_{q=1}^{Q} w(i_{ac})\left(\frac{1}{s(i_{ac})}y_2(i_{ac}, p, q) - z(t_{pq}(i_{ac}))\right)^2\right]$$

$w(i_{ac})$ are the weights ([0,1]) assigned to the various area coverages. These weights can be preassigned or determined from the customer image content or from user specified values. The adjusted exposure modulation profile may be applied by controller 100 to modulate exposing devices 13, as is known in the art. For examples of methods and systems for modulating the power or intensity of exposing devices, see, e.g., U.S. Pat. Nos. 7,492,381, 6,359,641, 5,818,507, 5,835,121, 5,659,414, 5,251,058, 5,165,074 and 4,400,740 and U.S. Patent Application Pub. No. 2003/0063183, each of which herein incorporated by reference in its entirety.

Figure 5:
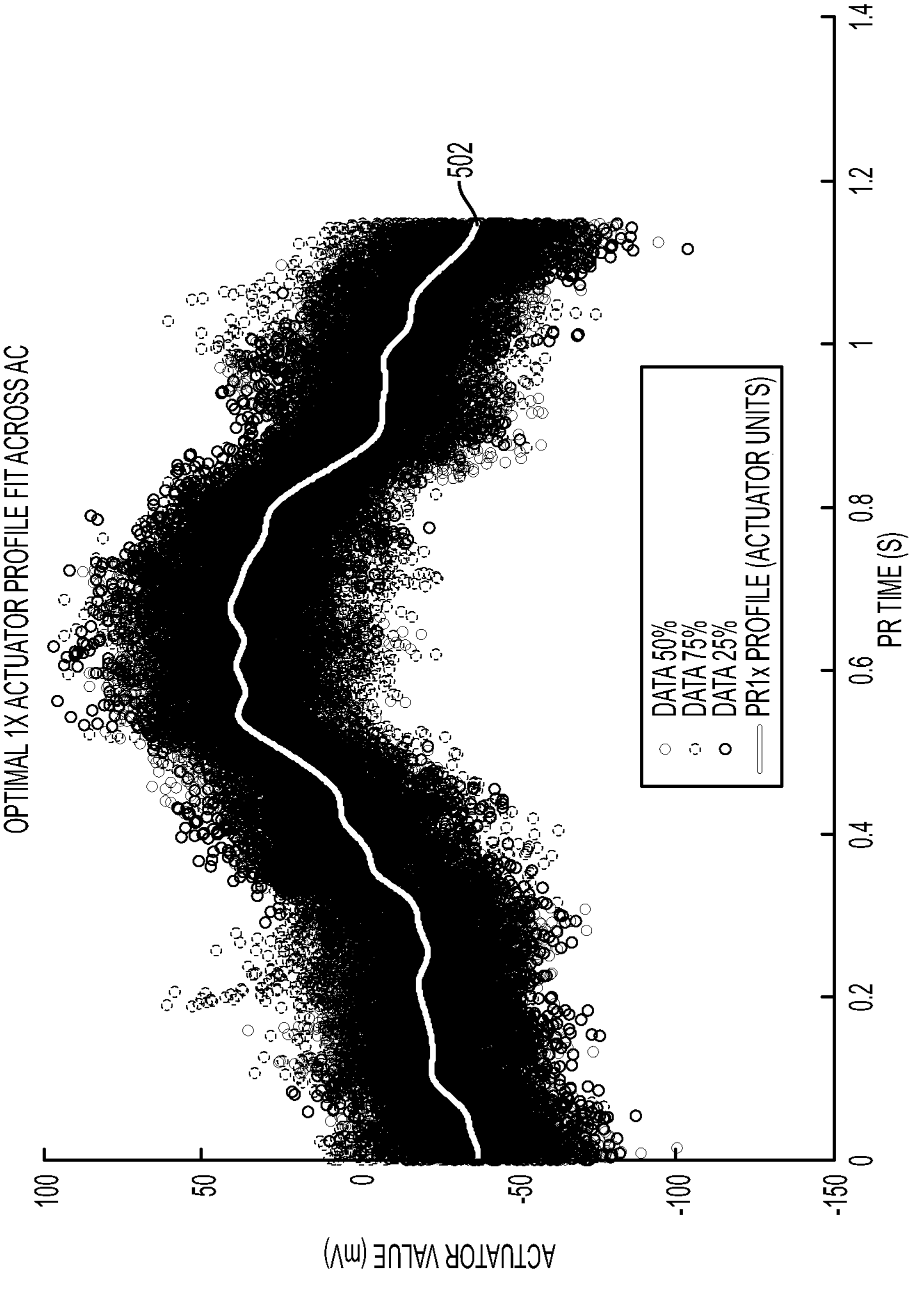
FIG. 5 illustrates an adjusted exposure modulation profile.

FIG. 5 illustrates curve 502 representing a adjusted exposure modulation profile for image photoreceptor one around banding correction obtained using the method of the present disclosure on a Xerox DocuColor 250®. Data representing three are coverages 25%, 50%, and 75% is shown. The weights $w(i_{ac})$ is assumed to equal one (=1) for all three area coverages.

Figure 6A:
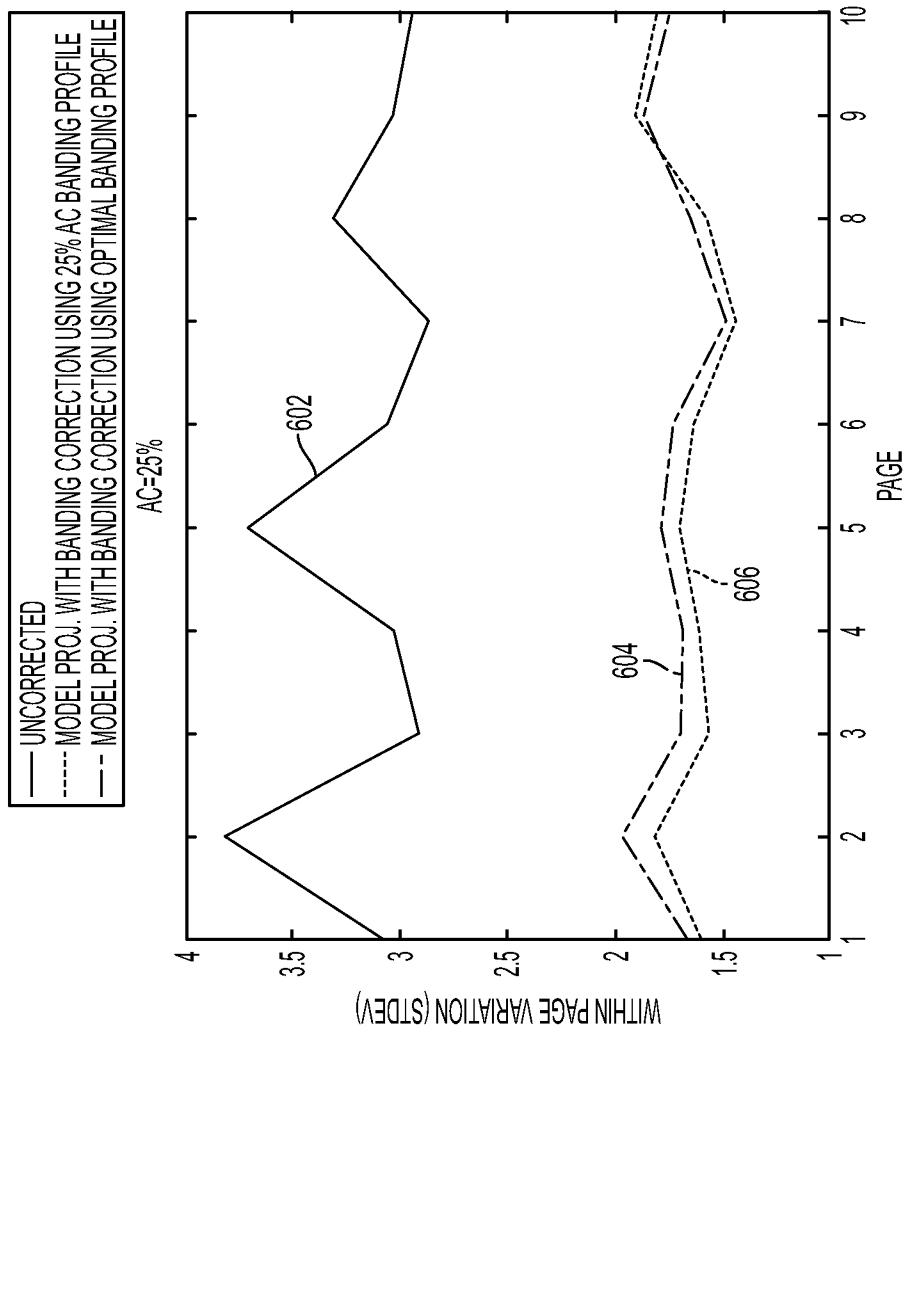
FIGS. 6A-6C illustrates expected performance of the adjusted exposure modulation profile for 25%, 50% and 75% area coverages, respectively.
Figure 6B:
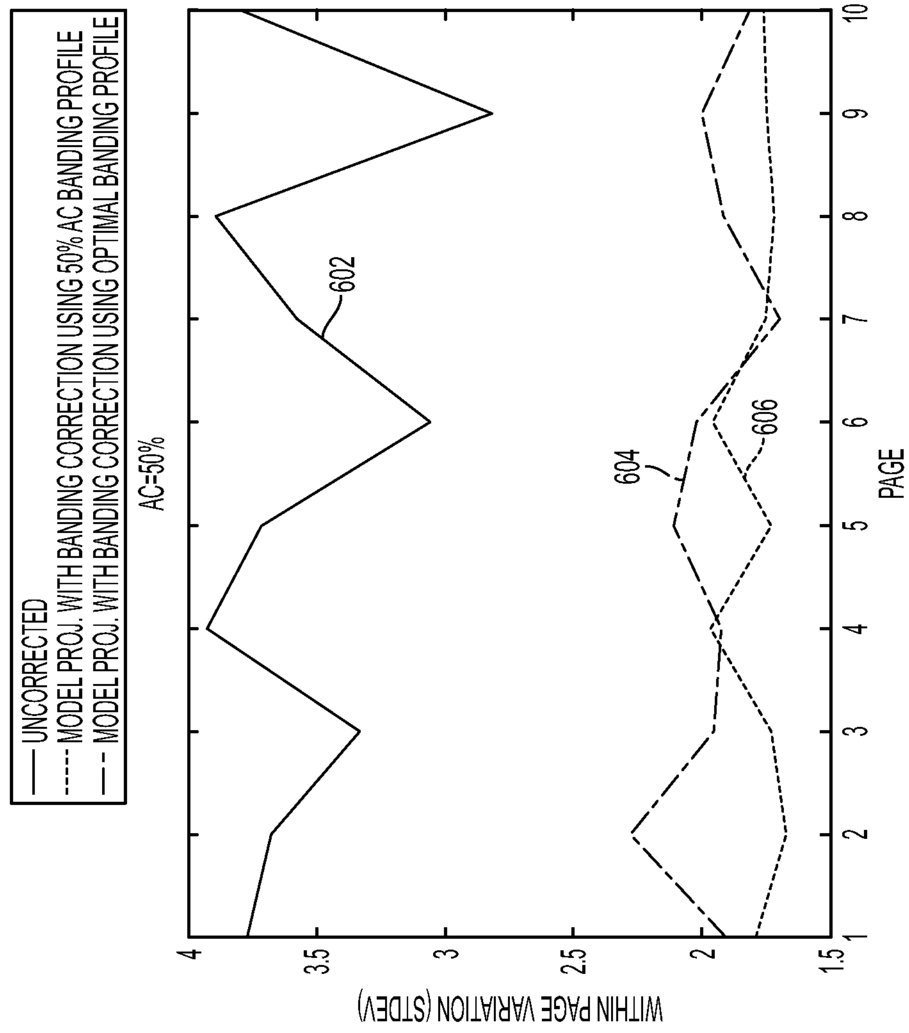
Figure 6C:
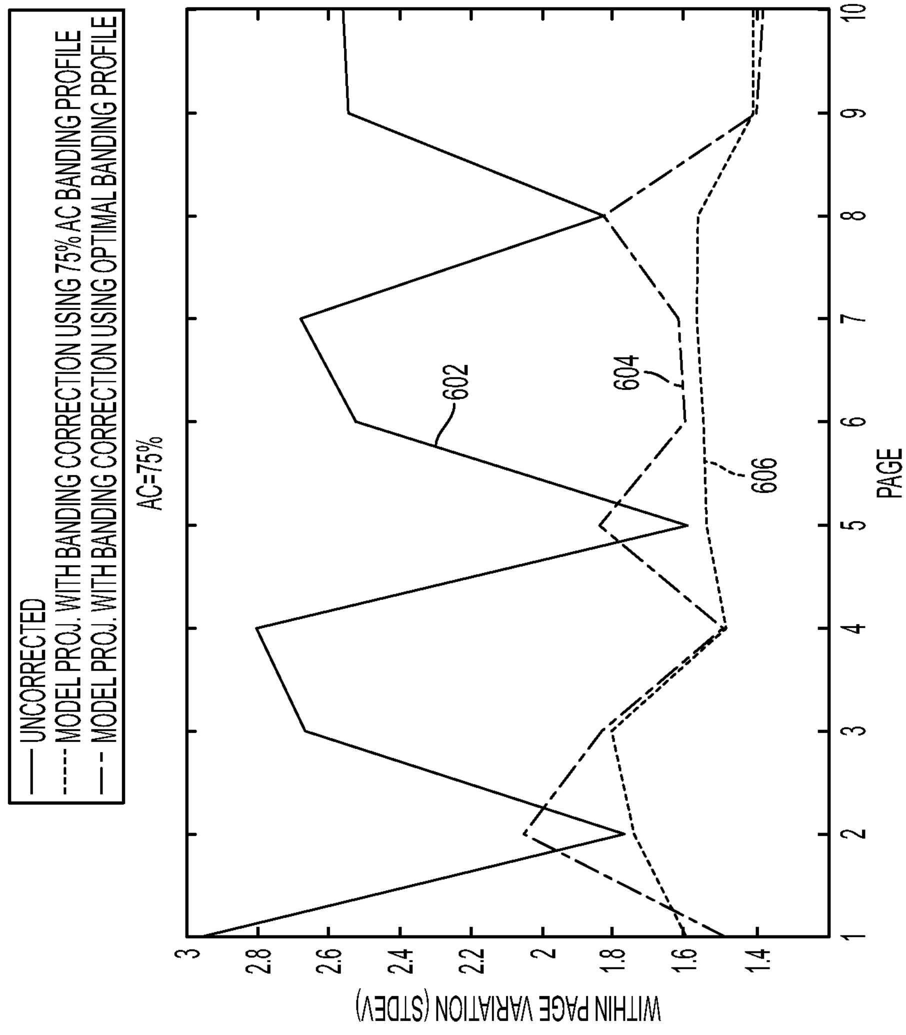

FIGS. 6A, 6B, and 6C illustrate expected performance of the adjusted exposure modulation profile for 25%, 50% and 75% area coverages, respectively, on lines 604. As shown in FIGS. 6A, 6B, and 6C, applying the adjusted exposure modulation profile, as shown in lines 604, significantly reduces the within page variation compared to the case where the banding defects are uncorrected, as shown in lines 602. FIGS. 6A, 6B, and 6C each also show the best case scenario where the exposure profile is individually tuned to each area coverage on lines 606. As shown, the performance of the adjusted exposure modulation profile appears to approximate the best case scenario.

Figure 7:
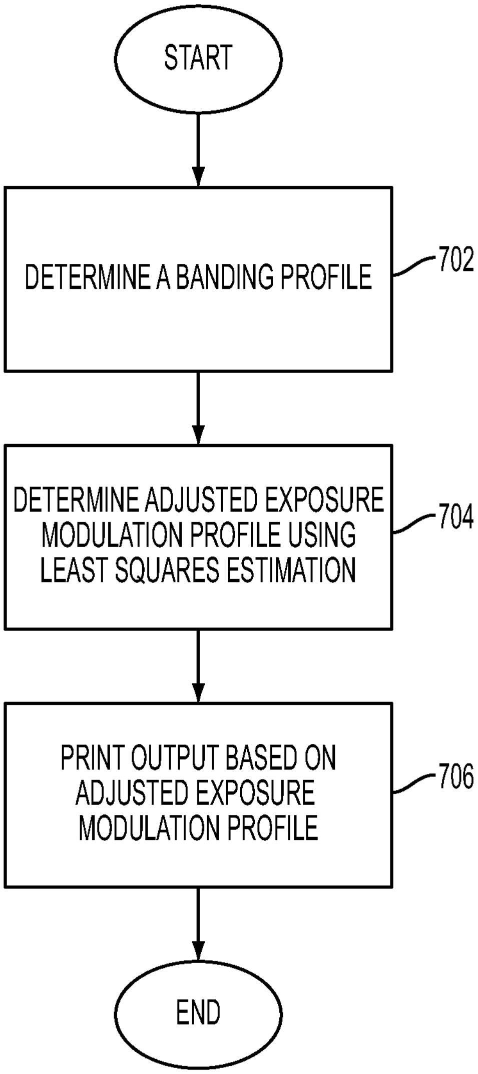
FIG. 7 illustrates an embodiment of a method for determining the adjusted exposure profile using least squares estimation.

FIG. 7 illustrates an embodiment of a method for determining the adjusted exposure profile using least squares estimation. In step 702, a banding profile is determined. The banding profile may be estimated by processor 90 for example. In step 704, an adjusted exposure modulation profile is estimated using least squares estimation. Both steps 702 and 704 may be performed by processor 90 for example. Optionally, in step 706, an output in printed based on the adjusted exposure modulation profile. In some embodiment, the adjusted exposure modulation profile may be applied across a TRC. The adjusted modulation profile may be applied across the TRC by controller 100 (shown in FIG. 1) for example. Applying the adjusted exposure modulation profile may involve modulating the power or intensity of exposing devices 13 (shown in FIG. 1) for example.

Figure 8:
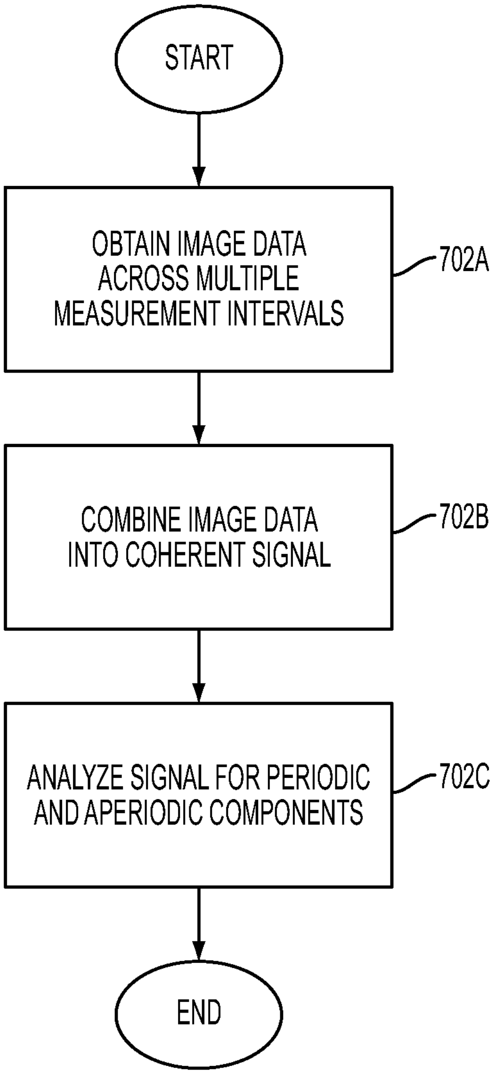
FIG. 8 illustrates an embodiment of the step of estimating a banding profile.

FIG. 8 illustrates one embodiment of step 702 (shown in FIG. 7) for estimating a banding profile. In step 702A, image data across multiple measurement intervals is obtained by a sensor, such as sensors 60 and/or 62. The measurement intervals may represent printed pages, interdocument zones, or customer image zones. In step 702B, the image data across multiple measurement intervals is combined into a coherent signal. In process step 702C, the signal is analyzed for periodic and aperiodic components, wherein the periodic components represent a banding profile.

These embodiments may also be advantageously used for tightly integrated parallel printing (TIPP) systems. Such systems are known where multiple printers are controlled to output a single print job, as disclosed in U.S. Pat. Nos. 7,136,616 and 7,024,152, each of which herein is incorporated by reference in its entirety. In TIPP systems, each printer may have defects in one or more components that cause banding. Each printer may have one or more exposing devices that may be modulated to compensate for banding. It should be appreciated that the adjusted exposure modulation profile may be calculated for each exposing device in each printer.

Embodiments may be made in hardware, firmware, software, or various combinations thereof. Embodiments may also be implemented as instructions stored on a machine-readable medium, which may be read and executed using one or more processing devices. In one embodiment, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

The word "image printing system" as used herein encompasses any device, such as a copier, bookmaking machine, facsimile machine, or a multi-function machine. In addition, the word "image printing system" may include ink jet, laser or other pure printers, which performs a print outputting function for any purpose.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What we claim is:

1. A method for estimating an exposure modulation in an image printing system comprising at least one marking engine, the at least one marking engine comprising a charging device for charging the image bearing surface, an exposing device for irradiating and discharging the image bearing surface to form a latent image, and a developer unit for developing toner to the image bearing surface, the method comprising:

determining, using a processor, a banding profile for an image printing system at different area coverages of a Tone Reproduction Curve (TRC), wherein the procedure of determining the banding profile further comprises:

obtaining image data across multiple measurement intervals for each area coverage by one or more sensors, combining the image data with timing information into a coherent signal, and analyzing the coherent signal for periodic and aperiodic components for each area coverage, wherein the periodic components represent the banding profile; determining, using the processor, an adjusted exposure modulation profile based on the determined banding profile using a least squares estimation; and printing an output based on the adjusted exposure modulation profile, wherein the adjusted exposure modulation profile is configured to provide an optimal banding correction across all the area coverages of the TRC.

2. The method according to claim 1, wherein the least squares estimation method is a weighted least squares estimation method, wherein the weights are values assigned for the different area coverages.

3. The method according to claim 2, wherein the weights for the different area coverages are preset in the factory or dynamically adjusted based on a customer image or user input.

4. The method according to claim 1, wherein the aperiodic components of the banding profile represent page-to-page drift variation and lead edge to trail edge variation.

5. The method according to claim 1, wherein the timing information comprises one or more page synchronization signals and/or one or more once-around signals from one or more banding sources.

6. The method according to claim 1, wherein said multiple measurement intervals are at least one of printed pages, inter-documents zones, and customer image zones.

7. The method according to claim 1, wherein said method further comprises applying the adjusted exposure modulation profile to the Tone Reproduction Curve (TRC).

8. A system for estimating an exposure modulation in an image printing system:

a marking engine;

a sensor configured to obtain image data across multiple measurement intervals; an exposing device; and a processor configured to:

determine a banding profile for the image printing system at different area coverages of a Tone Reproduction Curve (TRC), wherein to determine the banding profile the processor is further configured to:

obtain image data across multiple measurement intervals for each area coverage by one or more sensors, combine the image data with timing information into a coherent signal, and analyze the coherent signal for periodic and aperiodic components for each area coverage, wherein the periodic components represent the banding profile, determine an adjusted exposure modulation profile based on the determined banding profile using a least squares estimation, wherein the adjusted exposure modulation profile is configured to provide an optimal banding correction across all the area coverages of the TRC.

9. The system according to claim 8, wherein the least squares estimation method is a weighted least squares estimation method, wherein the weights are values assigned for the different area coverages.

10. The system according to claim 9, wherein the weights for the different area coverages are preset in the factory or dynamically adjusted based on a customer image or user input.

11. The system according to claim 8, wherein the aperiodic components of the banding profile represent page-to-page drift variation and lead edge to trail edge variation.

12. The method according to claim 8, wherein the timing information comprises one or more page synchronization signals and/or one or more once-around signals from one or more banding sources.

13. The system according to claim 8, wherein said multiple measurement intervals are at least one of printed pages, interdocuments zones, and customer image zones.

14. The system according to claim 8, further comprising a controller configured to apply the adjusted exposure modulation profile to the Tone Reproduction Curve (TRC).

15. A non-transitory computer-readable storage medium comprising a computer program product encoded with computer executable instructions that when executed by a processor are configured, to implement a method for estimating an exposure modulation in an image printing system, said method comprising:

determining a banding profile for an image printing system at different area coverages of a Tone Reproduction Curve (TRC), wherein the procedure of determining the banding profile further comprises:

obtaining image data of images sensed across multiple measurement intervals for each area coverage by a sensor, combining the image data with timing information into a coherent signal, and analyzing the coherent signal for periodic and aperiodic components for each area coverage, wherein the periodic components represent the banding profile; and determining an adjusted exposure modulation profile based on the determined banding profile using a least squares estimation, wherein the adjusted exposure modulation profile is configured to provide an optimal banding correction across all the area coverages of the TRC.

16. The non-transitory computer-readable storage medium according to claim 15, wherein the least squares estimation method is a weighted least squares estimation method, wherein the weights are values assigned for the different area coverages.

17. The non-transitory computer-readable storage medium according to claim 16, wherein the weights for the different area coverages are preset in the factory or dynamically adjusted based on a customer image or user input.

18. The non-transitory computer-readable storage medium according to claim 15, wherein the aperiodic components of the banding profile represent page-to-page drift variation and lead edge to trail edge variation.

19. The non-transitory computer-readable storage medium according to claim 15, wherein the timing information comprises one or more page synchronization signals and/or one or more once-around signals from one or more banding sources.

20. The non-transitory computer-readable storage medium according to claim 15, wherein said multiple measurement intervals are printed pages, interdocuments zones, and/or customer image zones.

21. The non-transitory computer-readable storage medium according to claim 15, wherein said method further comprises applying the adjusted exposure modulation profile to the Tone Reproduction Curve (TRC).

* * * * *